Patented Nov. 11, 1924.

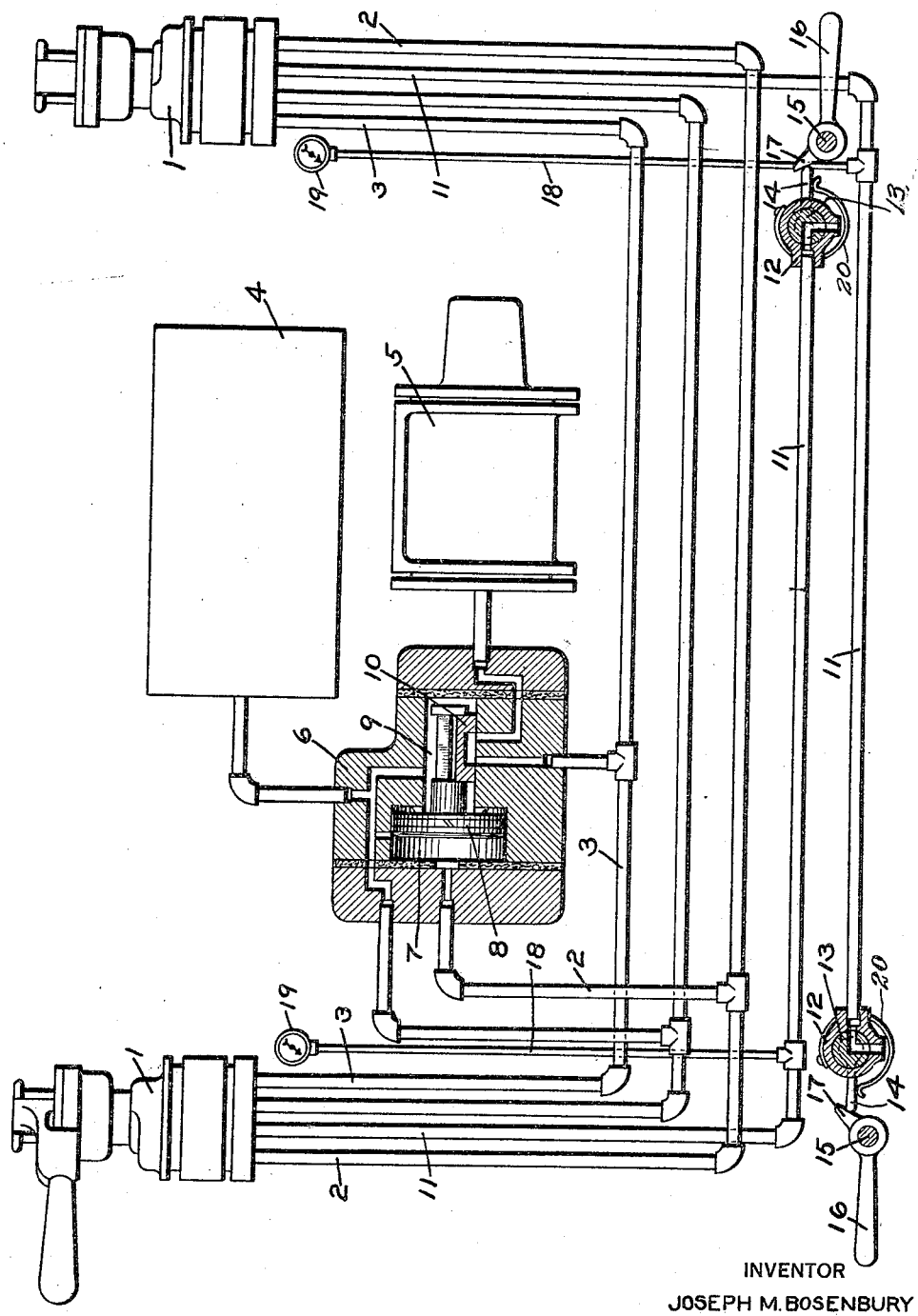

1,514,646

UNITED STATES PATENT OFFICE.

JOSEPH M. BOSENBURY, OF PEORIA, ILLINOIS.

DOOR-CONTROL DEVICE.

Application filed December 15, 1922. Serial No. 607,217.

*To all whom it may concern:*

Be it known that I, JOSEPH M. BOSENBURY, a citizen of the United States, residing at Peoria, in the county of Peoria and State of Illinois, have invented new and useful Improvements in Door-Control Devices, of which the following is a specification.

This invention relates to car door and brake controlling devices and the principal object of my invention is to provide an interlock device for preventing the release of the brakes while the car door remains open.

In the accompanying drawing, the single figure is a diagrammatic view of a car fluid pressure brake equipment with my improvement applied thereto.

It has heretofore been proposed to provide a car equipment having a rear door in addition to the usual entrance and exit doors, and during rush hours, this door may be manually opened by a fare taker outside of the car, who collects fares from the passengers as they enter the car.

In order to prevent the release of the brakes and the starting of the car while this rear door remains open, I provide means operated by the opening of the car door for closing communication through which fluid is released from the brake cylinder when the brake valve is manipulated to release the brakes.

As shown in the drawing, the equipment may comprise a brake valve device 1 at each end of the car, if the car is of the double end type, a brake pipe 2, a straight air pipe 3, a main reservoir 4, a brake cylinder 5, and an emergency valve device 6.

The emergency valve device 6 may be of the usual construction comprising a casing having a piston chamber 7, connected to the brake pipe 2 and containing piston 8 and a valve chamber 9 connected to reservoir 4 and containing slide valve 10 adapted to be operated by piston 8.

The pipe 11 through which fluid is released from the brake cylinder by operation of the brake valve device 1 is extended from either brake valve device to the opposite end of the car and a valve device 12 is provided at the end of the pipe having a valve 13 adapted in one position to connect the pipe 11 with the atmosphere and having another position in which the exhaust is closed. The valve is provided with a spring 20 tending to move the valve to its normal open position and has an operating member 14.

The reference numeral 15 indicates a shaft, the rotation of which is adapted to effect the opening and closing of a car door. An operating handle 16 is provided on the shaft 15 for rotating the shaft and said handle is provided with a finger 17 adapted to engage the member 14. Connected by pipe 18 to the exhaust pipe at each end of the car is a pressure gage 19 for indicating the pressure in said pipe.

In operation, assuming the brakes to have been applied and the car stopped to take on passengers, if the fare taker operates the handle 16 to rotate the shaft 15 so as to open the car door, the member 14 will be operated by the movement of the finger 17 so as to rotate the valve 13 and close the atmospheric exhaust through the exhaust pipe 11. In the release position of the brake valve device 1, the straight air pipe 3, through which fluid under pressure is released from the brake cylinder 5, is connected to the exhaust pipe 11 and it will be evident that if the motorman turns the brake valve to release position while the car door remains in the open position, the valve 13 being in its closed position prevents the release of the brakes, so that the car cannot be started when the door is open. As soon as the fare taker closes the door, the valve 13 will be returned to its normal open position by its spring, so that the motorman can now release the brakes by turning the brake valve handle to release position.

The gage 19 serves as an indicator for the motorman, since if the gage shows pressure when the brake valve is moved to release position, it will be indicate that the rear door is still open.

Having now described my invention, what I claim as new and desire to secure by Letters Patent, is:—

1. In a safety control device, the combination with means for opening and closing a car door, a brake cylinder, and a brake valve device for controlling the application and release of the brakes, of a valve positively operated upon opening the car door and independently of the brake cylinder, pressure for cutting off the exhaust of fluid from the brake cylinder through said brake valve device.

2. In a safety control device, the combination with means for opening and closing a car door, a brake cylinder, and a brake valve device for controlling the release of fluid under pressure from said brake cylinder, of a valve mechanically connected to and operated by the movement of said door controlling means to open the car door for preventing the release of fluid from the brake cylinder through said brake valve device.

3. The combination with a brake cylinder and a brake valve device having a position for releasing fluid from the brake cylinder, of manually operated mechanical means for controlling the opening and closing of the car door and a valve mechanically connected to and operated by said means for controlling communication through which said brake valve device releases fluid from the brake cylinder.

4. The combination with a brake cylinder and a brake valve device having a position for releasing fluid from the brake cylinder, of manually operated means for controlling the opening and closing of the car door, a valve for controlling communication through which fluid is released from the brake cylinder by operation of the brake valve device, a spring tending to maintain said valve in open position, and a mechanical connection between said valve and said means for shifting said valve to its closed position upon movement of said means to open the car doors.

5. In a safety control device, the combination with means for opening and closing a car door at one end of the car, of a brake cylinder, a brake valve device at the other end of the car having a position for releasing fluid from the brake cylinder through an exhaust pipe, means controlled by said door operating means for controlling communication through which said brake valve device releases fluid from the brake cylinder, and means for indicating the pressure in said exhaust pipe.

In testimony whereof I have hereunto set my hand.

JOSEPH M. BOSENBURY.